(12) United States Patent
Nishimiya

(10) Patent No.: US 11,000,904 B2
(45) Date of Patent: May 11, 2021

(54) CHUCK DEVICE

(71) Applicant: KITAGAWA IRON WORKS CO., LTD., Fuchu (JP)

(72) Inventor: Tamio Nishimiya, Fuchu (JP)

(73) Assignee: KITAGAWA IRON WORKS CO., LTD., Fuchu (JP)

( * ) Notice: Subject to any disclaimer, the term of this patent is extended or adjusted under 35 U.S.C. 154(b) by 261 days.

(21) Appl. No.: 16/304,214

(22) PCT Filed: May 25, 2017

(86) PCT No.: PCT/JP2017/019452
§ 371 (c)(1),
(2) Date: Nov. 23, 2018

(87) PCT Pub. No.: WO2017/204273
PCT Pub. Date: Nov. 30, 2017

(65) Prior Publication Data
US 2020/0316692 A1  Oct. 8, 2020

(30) Foreign Application Priority Data
May 25, 2016 (JP) .............................. JP2016-104282

(51) Int. Cl.
*B23B 31/177* (2006.01)

(52) U.S. Cl.
CPC ....... *B23B 31/16233* (2013.01); *Y10T 279/19* (2015.01)

(58) Field of Classification Search
CPC ............. B23B 31/16233; Y10T 279/19; Y10T 279/1966
See application file for complete search history.

(56) References Cited

U.S. PATENT DOCUMENTS

| | | | | |
|---|---|---|---|---|
| 1,305,138 A | * | 5/1919 | McClellan | ........ B23B 31/16233 279/121 |
| 2,697,612 A | * | 12/1954 | Sloan | ................ B23B 31/16233 279/121 |
| 4,288,085 A | * | 9/1981 | Antoni | .............. B23B 31/16233 279/121 |
| 8,016,298 B2 | * | 9/2011 | Tajnafoi | ............ B23B 31/16295 279/121 |
| 2004/0169342 A1 | | 9/2004 | Nishimiya et al. | |

FOREIGN PATENT DOCUMENTS

| | | | | |
|---|---|---|---|---|
| DE | 2541976 A1 | * | 3/1977 | ....... B23B 31/16254 |
| DE | 3212759 A1 | * | 10/1983 | ....... B23B 31/16233 |
| DE | 41 43 428 A1 | | 9/1993 | |
| JP | 62-213906 A | | 9/1987 | |

(Continued)

*Primary Examiner* — Eric A. Gates
(74) *Attorney, Agent, or Firm* — Maschoff Brennan

(57) ABSTRACT

An inner circumferential surface of a chuck body (2) has three fitting recesses (22) curved as viewed from a rotational axis (C1). An outward elastic deformation that occurs, through gripping of a work (W1) with top jaws (5), at portions of a plunger (3) which correspond to slide holes (31a) causes the portions deformed by the elastic deformation to slide on the respective recessed portions (22) so that the plunger (3) is moved to cause a symmetry axis (Y1) of the slide hole (31a) to coincide with a symmetry axis (Y2) of a guide groove (25) of the chuck body (2).

3 Claims, 13 Drawing Sheets

(56) References Cited

FOREIGN PATENT DOCUMENTS

| | | |
|---|---|---|
| JP | H05-212608 A | 8/1993 |
| JP | 08-168906 A | 7/1996 |
| JP | 2007-319945 A | 12/2007 |
| JP | 4194488 B2 | 12/2008 |
| JP | 2011-177871 A | 9/2011 |
| JP | 2015-58529 A | 3/2015 |
| JP | 6345321 B1 * | 6/2018 ....... B23B 31/16233 |

* cited by examiner

CHUCK DEVICE

TECHNICAL FIELD

The present invention relates to a chuck device used by being attached to a machine tool such as a lathe.

BACKGROUND ART

As a known example, the chuck device disclosed in Patent Document 1, for example, includes a chuck body having an accommodation space therein. The chuck body is provided with three guide grooves around the rotational axis of the chuck body at equal intervals. Each guide groove communicates with the accommodation space and extends linearly in a direction orthogonal to the rotational axis of the chuck body. A plunger is accommodated in the accommodation space so as to be slidable along the rotational axis. The plunger is provided with slide holes at portions corresponding to the guide grooves, and the slide holes are linearly inclined so as to be gradually away from the rotational axis as they get away from the respective guide grooves. A master jaw having approximately a T-shaped side view is inserted in a portion of the guide groove communicating with the accommodation space. One end portion of the master jaw is provided with a columnar portion slidably fitted in the slide hole, whereas a block-shaped top jaw is attached to the other end portion of the master jaw. When the plunger is slid toward one side, the surface forming the slide hole of the plunger slides along the outer circumferential surface of the columnar portion, and pushes the columnar portion toward the rotational axis, causing the master jaw to move along the guide groove and come close to the rotational axis, and causing the top jaw to grip a work. On the other hand, when the plunger is slid toward the other side, the surface forming the slide hole of the plunger slides along the outer circumferential surface of the columnar portion, and pushes the columnar portion away from the rotational axis, causing the master jaw to move along the guide groove and to be apart from the rotational axis, and causing the work to be released from the top jaw.

CITATION LIST

Patent Documents

Patent Document 1: Japanese Patent No. 4194488

SUMMARY OF THE INVENTION

Technical Problem

According to a typical chuck device, such as the one disclosed in Patent Document 1, a slight gap is formed between the chuck body and the plunger so that the plunger can slide along the rotational axis of the chuck body. This slight gap causes a slight backlash of the plunger with respect to the chuck body around the rotational axis. It is also known that in gripping a work, an outward reaction force of the gripping force is generated at a portion around the slide hole of the plunger, and this reaction force elastically deforms the outer circumferential portion of the plunger outward. If the outer circumferential portion of the plunger is elastically deformed by the amount of the slight gap formed between the chuck body and the plunger at the time of gripping of a work, the outer circumferential portion of the plunger is pressed against the inner circumferential surface of the chuck body, and the plunger cannot move, and is fixed, with respect to the chuck body. Thus, the position where the work is gripped by the top jaw may slightly misalign with a reference position, if the plunger is fixed to the chuck body due to the reaction force of the gripping force generated in gripping the work while the slide hole is located at a position which misaligns with a predetermined position with respect to the guide groove, within a range of the slight backlash of the plunger with respect to the chuck body around the rotational axis.

It is therefore an object of the present invention to provide a chuck device with a high gripping accuracy, in which a grip position of a work does not misalign with a reference position.

Solution to the Problem

To achieve the above object, the present invention utilizes a sliding movement of a deformed portion of a plunger, which is deformed at the time of gripping of a work, on an inner circumferential surface of a chuck body in order to carry out positioning of a plunger with respect to the chuck body.

Specifically, the present invention is directed to a chuck device, including: a chuck body used by being attached to a rotatable spindle, the chuck body being rotatable about a rotational axis and having an accommodation space inside, the chuck body being provided with a plurality of guide portions around the rotational axis at equal intervals, the guide portions communicating with the accommodation space and extending in a direction orthogonal to the rotational axis; a plurality of master jaws which are guided in the guide portions, one end portion of each of the plurality of master jaws being accommodated in the accommodation space, the master jaws having top jaws each attached to the other end portion of an associated one of the plurality of master jaws; and a plunger accommodated in the accommodation space and arranged so as to be slidable along the rotational axis, the plunger being provided with a plurality of engaging means, each of which engages with the one end portion of the associated one of the master jaws, a sliding movement of the plunger in one direction causing the engaging means to move the master jaws along the guide portions toward a proximity of the rotational axis, thereby causing the top jaws to grip a work, and a sliding movement of the plunger in the other direction causing the engaging means to move the master jaws along the guide portions away from the rotational axis, thereby causing the top jaws to release the work. The following measures are taken in such a chuck device.

That is, in a first aspect of the invention, an inner circumferential surface of the chuck body around the rotational axis has a positioning portion, and an outward elastic deformation that occurs, through gripping of the work with the top jaws, at portions of the plunger which correspond to the engaging means causes the portions deformed by the elastic deformation to slide on the positioning portion so that the plunger is moved to cause the engaging means to coincide with predetermined positions with respect to the guide portions.

A second aspect of the invention is an embodiment of the first aspect of the invention. In the second aspect, the plunger has protruding portions at positions corresponding to the engaging means, each of the protruding portions protruding so as to be away from the rotational axis and to have a curved cross section orthogonal to the rotational axis, and the positioning portion is composed of a plurality of fitting recesses each of which has a recess-shaped cross section orthogonal to the rotational axis, and in each of which an associated one of the protruding portions is fitted with a slight gap interposed therebetween.

A third aspect of the invention is an embodiment of the second aspect of the invention. In the third aspect, an inner circumferential surface of each of the fitting recesses is curved to have a first curvature radius as viewed along an extension direction of the rotational axis, and an inner circumferential surface of each of the protruding portions is curved to have a second curvature radius as viewed along the extension direction of the rotational axis, and the first curvature radius, which is $\rho 1$, and the second curvature radius, which is $\rho 2$, are in a relationship of $\rho 1 \geq \rho 2$.

A fourth aspect of the invention is an embodiment of the first aspect of the invention. In the fourth aspect, the plunger has a plurality of flat surfaces at positions corresponding to the engaging means, each of the flat surfaces being orthogonal to the rotational axis and orthogonal to a straight line passing through a center of an associated one of the engaging means, and the positioning portion is composed of a plurality of sliding surfaces each of which is flat and orthogonal to an associated one of the guide portions, and toward which an associated one of the flat surfaces faces with a slight gap interposed therebetween.

Advantages of the Invention

According to the first aspect, in gripping the work by the top jaws, the elastic deformation of the plunger causes the engaging means to move to the predetermined positions with respect to the guide grooves. This contributes to reducing or preventing variations in the position of the plunger with respect to the chuck body at the time of completion of the gripping of the work by the top jaws, which means that the grip position of the work does not misalign with a reference position. It is therefore possible to grip the work precisely.

According to the second aspect, the increased thickness of a portion of the chuck body corresponding to a portion of the plunger between the protruding portions contributes to increasing the rigidity of the chuck body. This configuration can prevent the chuck body from being deformed in gripping of the work, and the master jaw from being tilted or misaligning with a predetermined position due to the deformation of the chuck body. As a result, a reduction in gripping accuracy of the top jaws can be prevented. Further, due to the increased rigidity of the chuck body, the chuck device is less likely to vibrate during processing of the work. As a result, chattering of the work can be prevented.

According to the third aspect, the curved protruding surface of the protruding portion is slid on the curved inner circumferential surface of the fitting recess when the plunger moves with respect to the chuck body. This configuration can achieve a smooth movement of the plunger with respect to the chuck body, and the positioning of the plunger with respect to the chuck body can be carried out efficiently.

According to the fourth aspect, processing of the chuck body and the plunger becomes easier, and the processing cost can thus be reduced, compared with the case of the second aspect, because a portion where positioning of the plunger with respect to the chuck body is carried out is a flat surface.

DESCRIPTION OF EMBODIMENTS

Embodiments of the present invention will be described in detail below, based on the drawings. The following description of the preferred embodiments is merely exemplary in nature.

First Embodiment of the Invention

Figure 1:
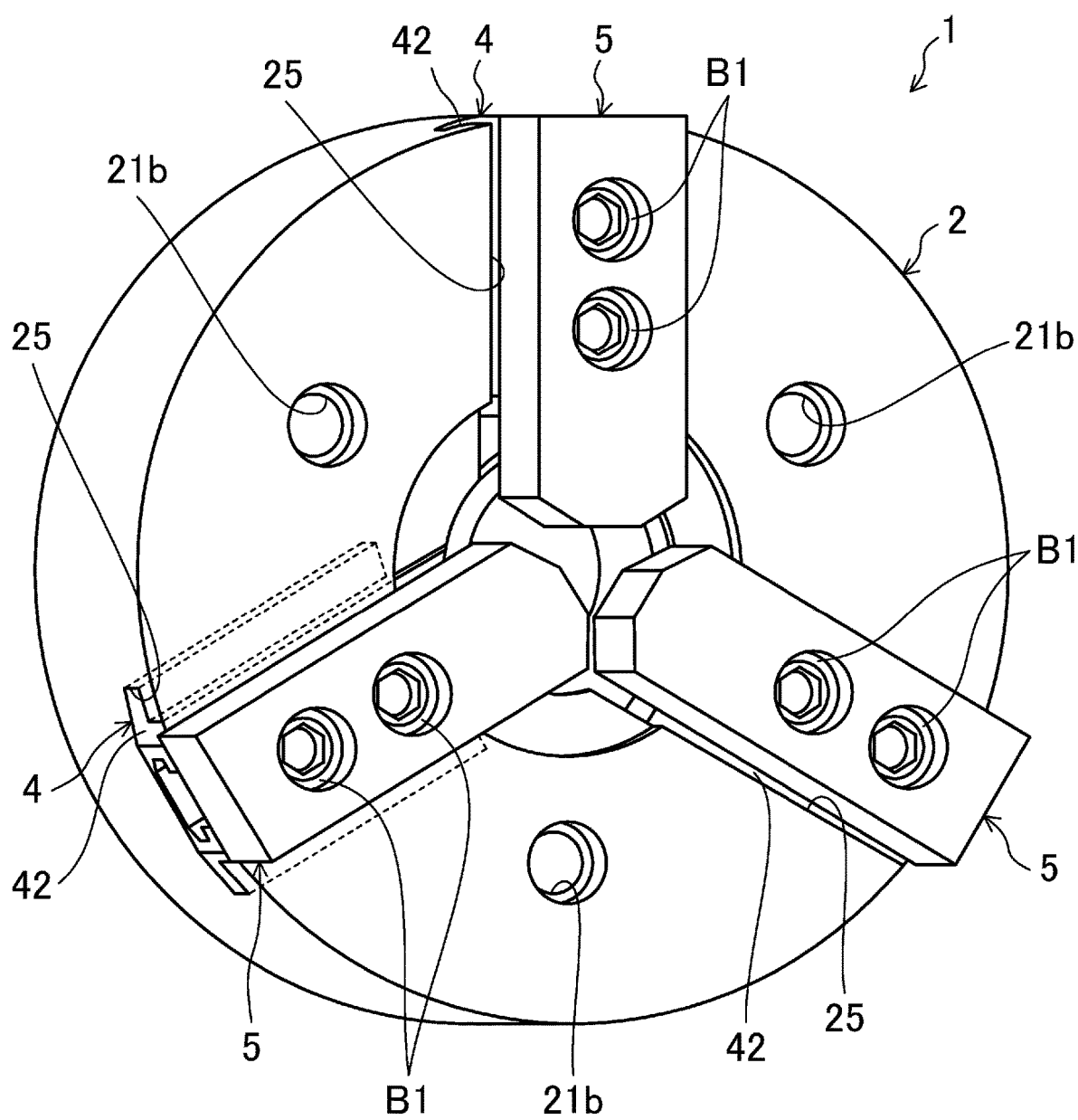
FIG. 1 is a perspective view of a chuck device according to a first embodiment of the present invention.

FIG. 1 illustrates a chuck device 1 according to a first embodiment of the present invention. The chuck device 1 is for attaching a work W1 (see FIGS. 3 and 4) to a machine tool, such as a lathe, and includes a disk-like chuck body 2 rotatable about a rotational axis C1 which is a central axis of the chuck device 1.

Figure 2:
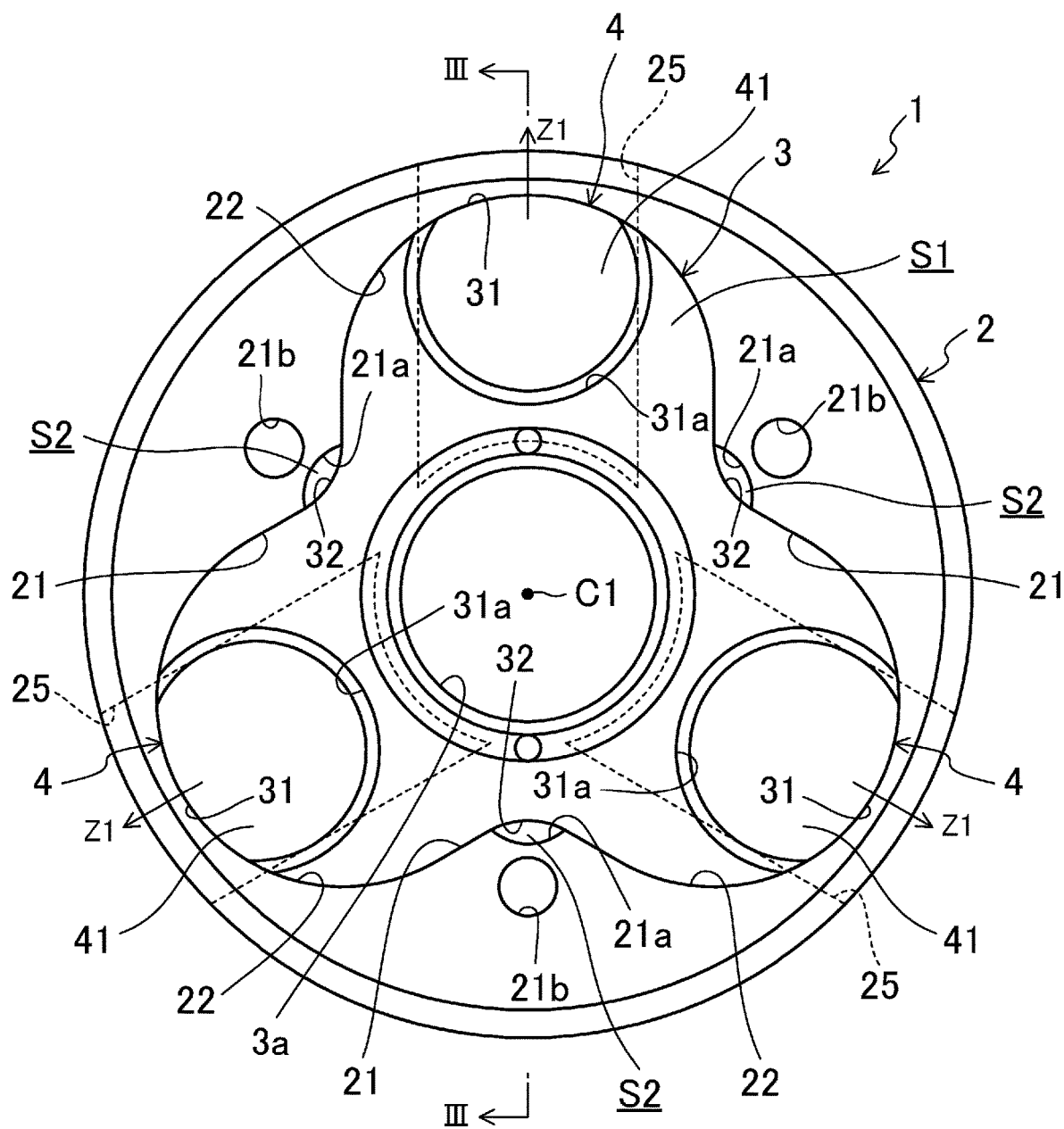
FIG. 2 is a rear view of the chuck device according to the first embodiment of the present invention.

As illustrated in FIG. 2, the chuck body 2 includes an accommodation space S1 having approximately a trefoil shape as viewed along the extension direction of the rotational axis C1. One end of the accommodation space S1 in the extension direction of the rotational axis C1 is open.

An inner circumferential surface of the chuck body 2 around the rotational axis C1 has three bulging portions 21 arranged at equal intervals and each having approximately a chevron shape as viewed along the extension direction of the rotational axis C1. A recessed groove 21a having a gently curved cross section orthogonal to the rotational axis C1 is provided at the top of each bulging portion 21 and extends linearly along the rotational axis C1.

A fixing hole 21b extending in the extension direction of the rotational axis C1 is formed through a central portion of each bulging portion 21, so that the chuck device 1 can be fastened to a spindle of a machine tool (not shown) with bolts or the like through the fixing hole 21b.

Three fitting recesses 22 (positioning portions), each having a recess-shaped cross section orthogonal to the rotational axis C1, are formed on the inner circumferential surface of the chuck body 2 around the rotational axis C1, each at a location between the bulging portions 21.

Each fitting recess 22 has a gently curved cross section orthogonal to the rotational axis C1 and extends linearly along the rotational axis C1.

Figure 5:
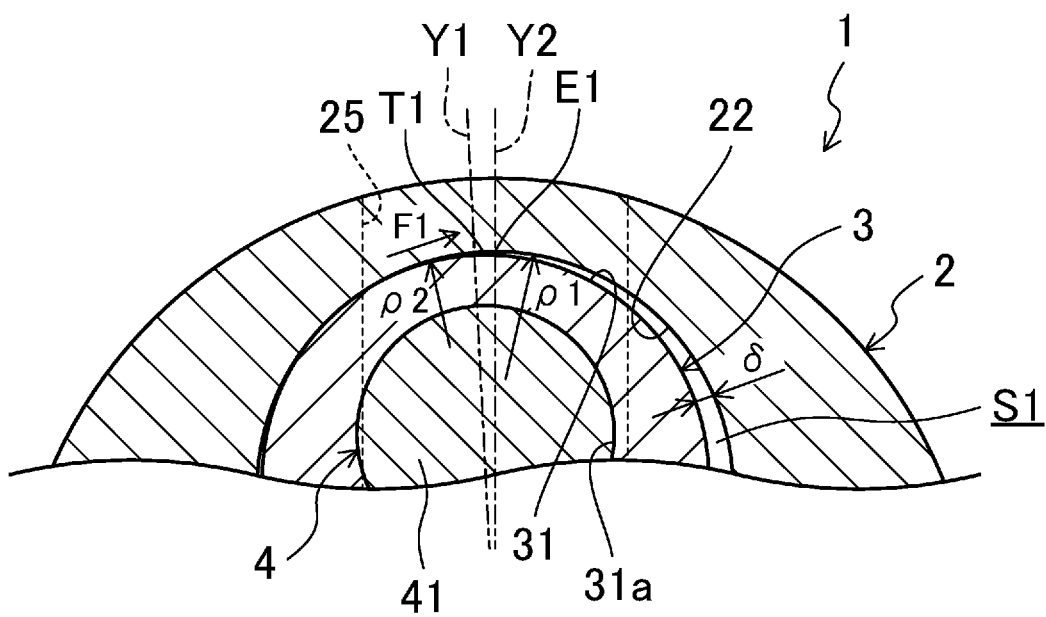
FIG. 5 is a cross-sectional view taken along the line V-V of FIG. 3.

Specifically, as illustrated in FIG. 5, the inner circumferential surface of the fitting recess 22 is curved to have a curvature radius ρ1 (a first curvature radius) as viewed along the extension direction of the rotational axis C1.

Figure 3:
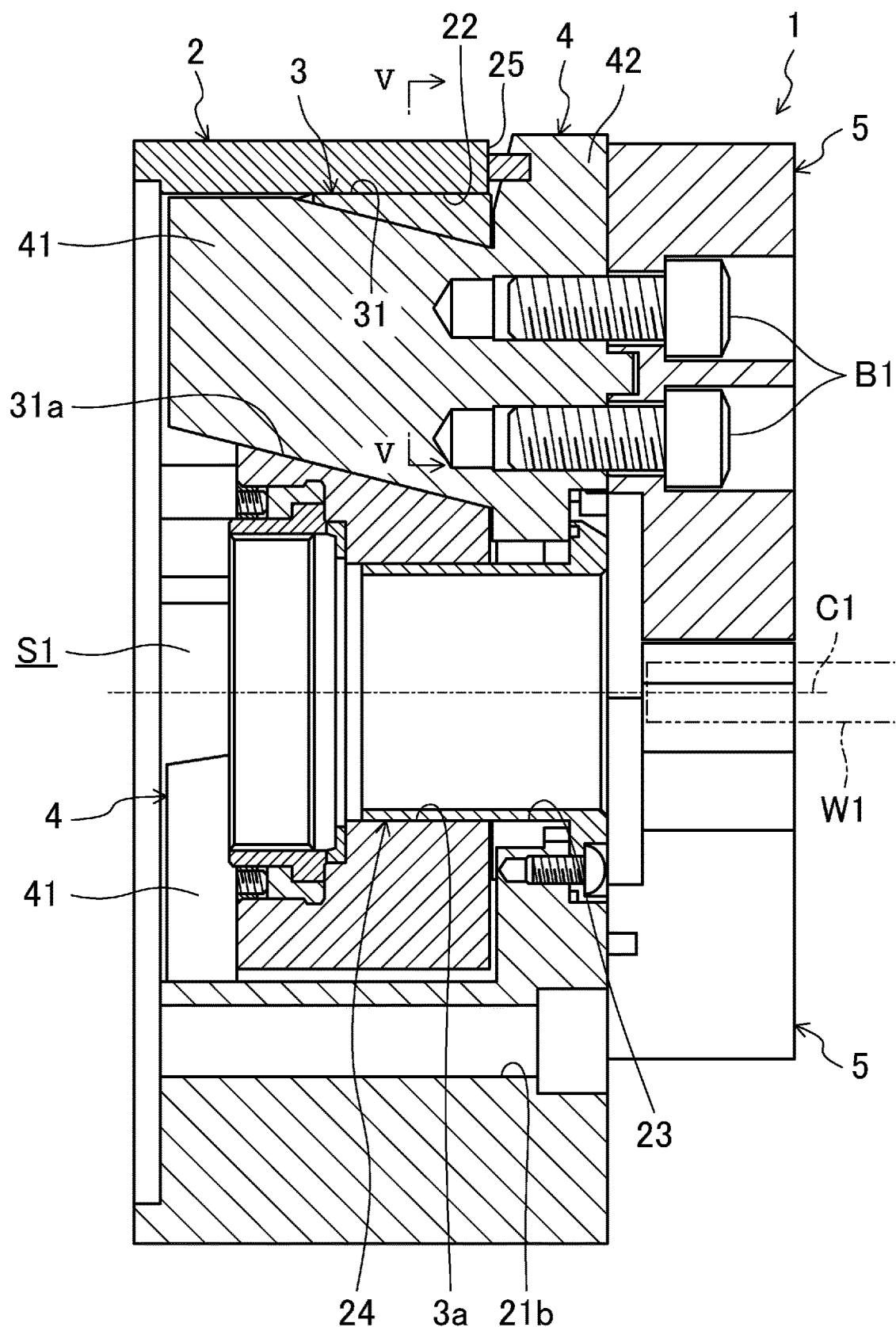
FIG. 3 is a cross-sectional view taken along the line of FIG. 2.
Figure 4:
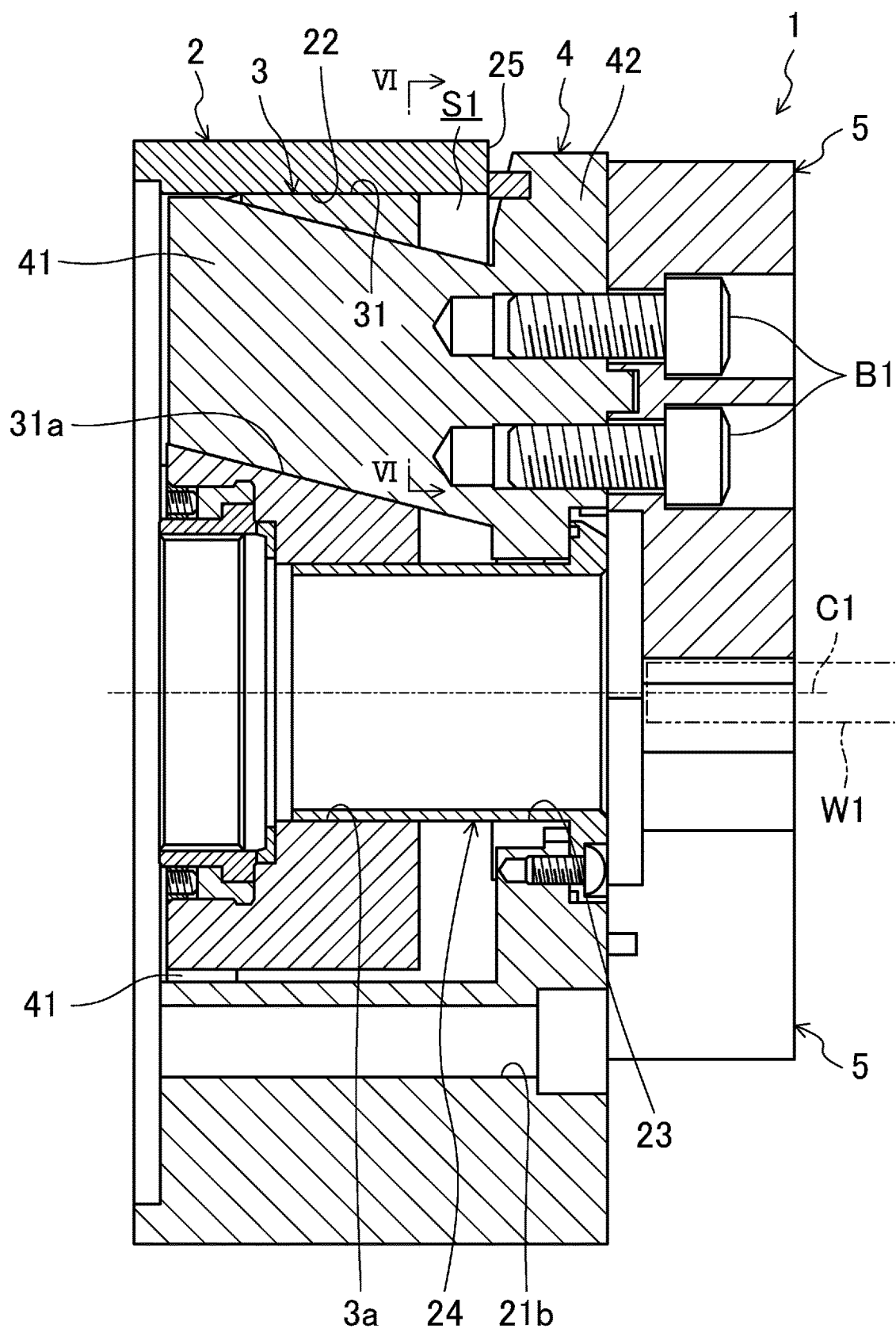
FIG. 4 is a view corresponding to FIG. 3 and shows a state of gripping a work.

As illustrated in FIGS. 3 and 4, a through hole 23 having a circular cross section is formed at a central portion of a wall surface of the other end of the chuck body 2 in the extension direction of the rotational axis C1.

A cylindrical member 24 is fitted in the through hole 23, and about a half of the cylindrical member 24 along the central axis of the cylindrical member 24 is in the accommodation space S1.

Three guide grooves 25 (guide portions) each having approximately a T-shaped cross section and extending in a direction orthogonal to the rotational axis C1 are formed around the respective through holes 23, and are arranged at equal intervals around the rotational axis C1. Each of the guide grooves 25 communicates with the accommodation space S1.

As illustrated in FIG. 2, the accommodation space S1 accommodates a plunger 3 having approximately a trefoil shape corresponding to the shape of the accommodation space S1.

A fitting hole 3a which extends in the extension direction of the rotational axis C1 and into which the cylindrical member 24 is slidably fitted is formed at a central portion of the plunger 3, so that the plunger 3 is slidable along the rotational axis C1.

The plunger 3 has three protruding portions 31 each protruding so as to be away from the rotational axis C1 and to have a curved cross section orthogonal to the rotational axis C1, at equal intervals around the rotational axis C1. As illustrated in FIG. 5, the protruding portions 31 are fitted to the respective fitting recesses 22 with a slight gap S.

Figure 6:
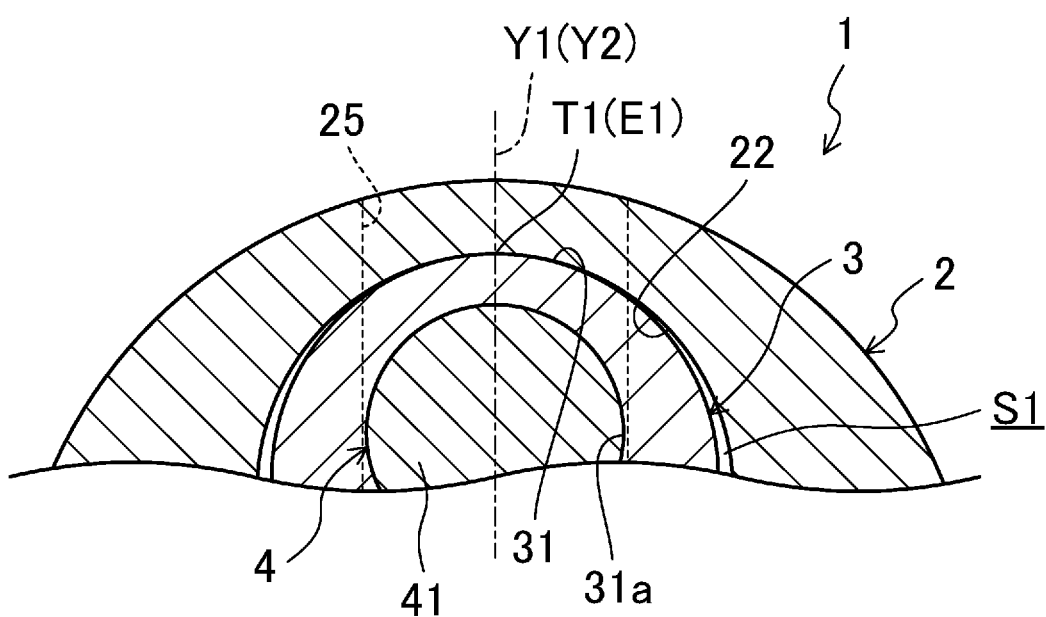
FIG. 6 is a cross-sectional view taken along the line VI-VI of FIG. 4.

In FIGS. 5 and 6, the gap δ is exaggerated for purposes of convenience.

A protruding surface of each protruding portion 31 is curved as viewed along the rotational axis C1. The radius of curvature ρ2 (a second curvature radius) of the protruding portion 31 is set to be ρ1≥ρ2.

As illustrated in FIG. 2, a curved recess 32 corresponding to each bulging portion 21 is formed between the protruding portions 31. A space S2 is formed between the curved recess 32 and the recessed groove 21a.

As illustrated in FIG. 3, the protruding portion 31 is provided with a slide hole 31a (an engaging means) having a circular cross section and inclined so as to be gradually away from the rotational axis C1 as the slide hole 31a gets closer to the one end in the extension direction of the rotational axis C1. Each slide hole 31a is open at one end in the extension direction of the rotational axis C1.

Three master jaws 4 each having approximately a T-shaped side view are disposed around the cylindrical member 24. Each of the master jaws 4 is inserted in a portion of the associated one of the guide grooves 25 which communicates with the accommodation space S1.

One end of each master jaw 4 is provided with a first slide portion 41 having a columnar shape. The first slide portion 41 is accommodated in the accommodation space S1.

Each first slide portion 41 is inclined so as to be gradually away from the rotational axis C1 as the slide portion 41 gets closer to the one end in the extension direction of the rotational axis C1. The first slide portion 41 is slidably fitted in each slide hole 31a of the plunger 3.

That is, each slide hole 31a of the plunger 3 is engaged with one end portion of the associated one of the master jaws 4.

On the other hand, as illustrated in FIG. 1, the other end portion of each master jaw 4 is provided with a second slide portion 42 each having a cross sectional shape corresponding to a cross sectional shape of the guide groove 25. The second slide portion 42 is guided into the guide groove 25.

A top jaw 5 in an elongated block-shape extending along the second slide portion 42 is secured to the second slide portion 42 with two bolts B 1.

Sliding of the plunger 3 toward the one side during a job using a machine tool (not shown) to which the chuck device 1 is attached causes a surface defining each slide hole 31a of the plunger 3 to slide on the outer circumferential surface of the first slide portion 41 of the master jaw 4, as illustrated in FIG. 4, and pushes the first slide portion 41 toward the rotational axis C1.

Pushing of the first slide portion 41 toward the rotational axis C1 by the surface defining the slide hole 31a of the plunger 3 causes a movement of the second slide portion 42 toward the proximity of the rotational axis C1 along the guide groove 25, and in gripping of the work W1 by the top jaws 5.

On the other hand, sliding of the plunger 3 toward the other side causes the surface defining each slide hole 31a of the plunger 3 to slide on the outer circumferential surface of the first slide portion 41 of the master jaw 4, as illustrated in FIG. 3, and pushes the first slide portion 41 away from the rotational axis C1.

Pushing of the first slide portion 41 away from the rotational axis C1 by the surface defining the slide hole 31a of the plunger 3 results in a movement of the second slide portion 42 away from the rotational axis C1 along the guide groove 25, and in a release of the work W1 from the top jaw 5.

Note that when the work W1 is gripped by the chuck device 1, a reaction force of the gripping force generated by the gripping of the work W1 by the top jaws 5 is applied outward (in the Z1 direction) to a portion of the plunger 3 corresponding to the slide hole 31a as illustrated in FIG. 2. The reaction force causes an outward elastic deformation of the portion of the plunger 3 corresponding to the slide hole 31a. As illustrated in FIGS. 5 and 6, the fitting recess 22 causes the plunger 3 to move in the F1 direction so that the portion deformed by the elastic deformation is slid on the inner circumferential surface of the fitting recess 22, and that a top T1 of each protruding portion 31 reaches a predetermined deep end portion E1 of the associated one of the fitting recesses 22, thereby causing a symmetry axis Y1, of each slide hole 31a, which passes through the central axis of the plunger 3, to coincide with a symmetry axis Y2, of each guide groove 25 of the chuck body 2, which passes through the rotational axis C1. That is, each fitting recess 22 makes the position of the slide hole 31a coincide with a predetermined position with respect to the guide groove 25. In this manner, when the work W1 is gripped by the top jaws 5, the elastic deformation of the plunger 3 causes the slide hole 31a to move to the predetermined position with respect to the guide groove 25. This contributes to reducing or preventing variations in the position of the plunger 3 with respect to the chuck body 2 at the time of completion of the gripping of the work W1 by the top jaws 5, which means that the grip position of the work W1 does not misalign with a reference position. It is therefore possible to grip the work W1 precisely.

In addition, the bulging portion 21 which bulges toward the rotational axis C1 and is arranged between the fitting recesses 22 of the chuck body 2 contributes to an increased thickness of a portion of the chuck body 2 corresponding to a portion of the plunger 3 between the protruding portions 31, which increases the rigidity of the chuck body 2. This configuration can prevent the chuck body 2 from being deformed in gripping of the work W1, and the master jaw 4 from being tilted or misaligning with a predetermined position due to the deformation of the chuck body 2. As a result, a reduction in gripping accuracy of the top jaws 5 can be prevented.

Further, due to the increased rigidity of the chuck body 2, the chuck device 1 is less likely to vibrate during processing of the work W1. As a result, chattering of the work W1 can be prevented.

Further, the curved protruding surface of the protruding portion 31 is slid on the curved inner circumferential surface of the fitting recess 22 when the plunger 3 moves with respect to the chuck body 2. This configuration can achieve a smooth movement of the plunger 3 with respect to the chuck body 2, and the positioning of the plunger 3 with respect to the chuck body 2 can be carried out efficiently.

Second Embodiment of the Invention

Figure 7:
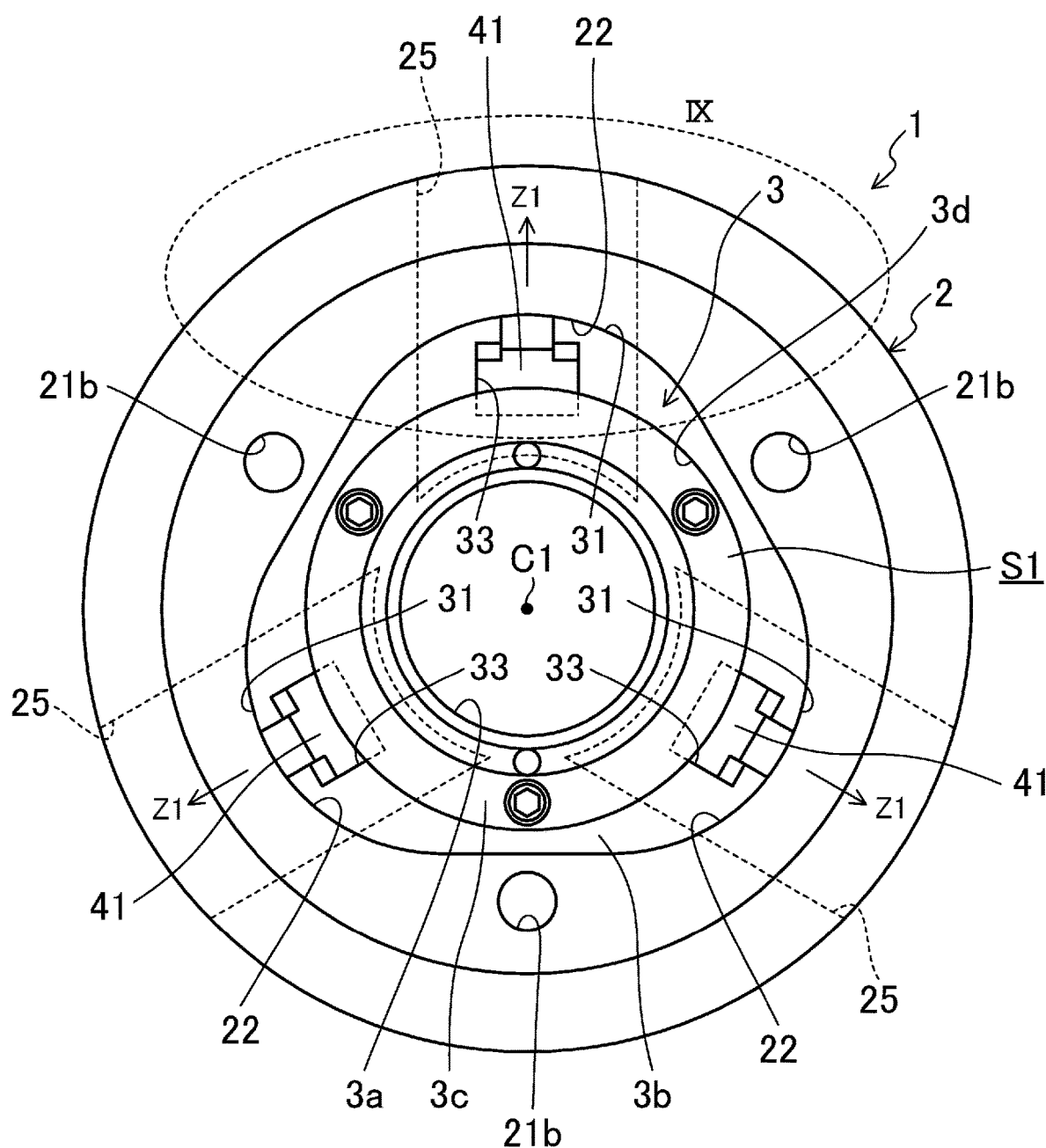
FIG. 7 is a rear view of a chuck device according to a second embodiment of the present invention.
Figure 8:
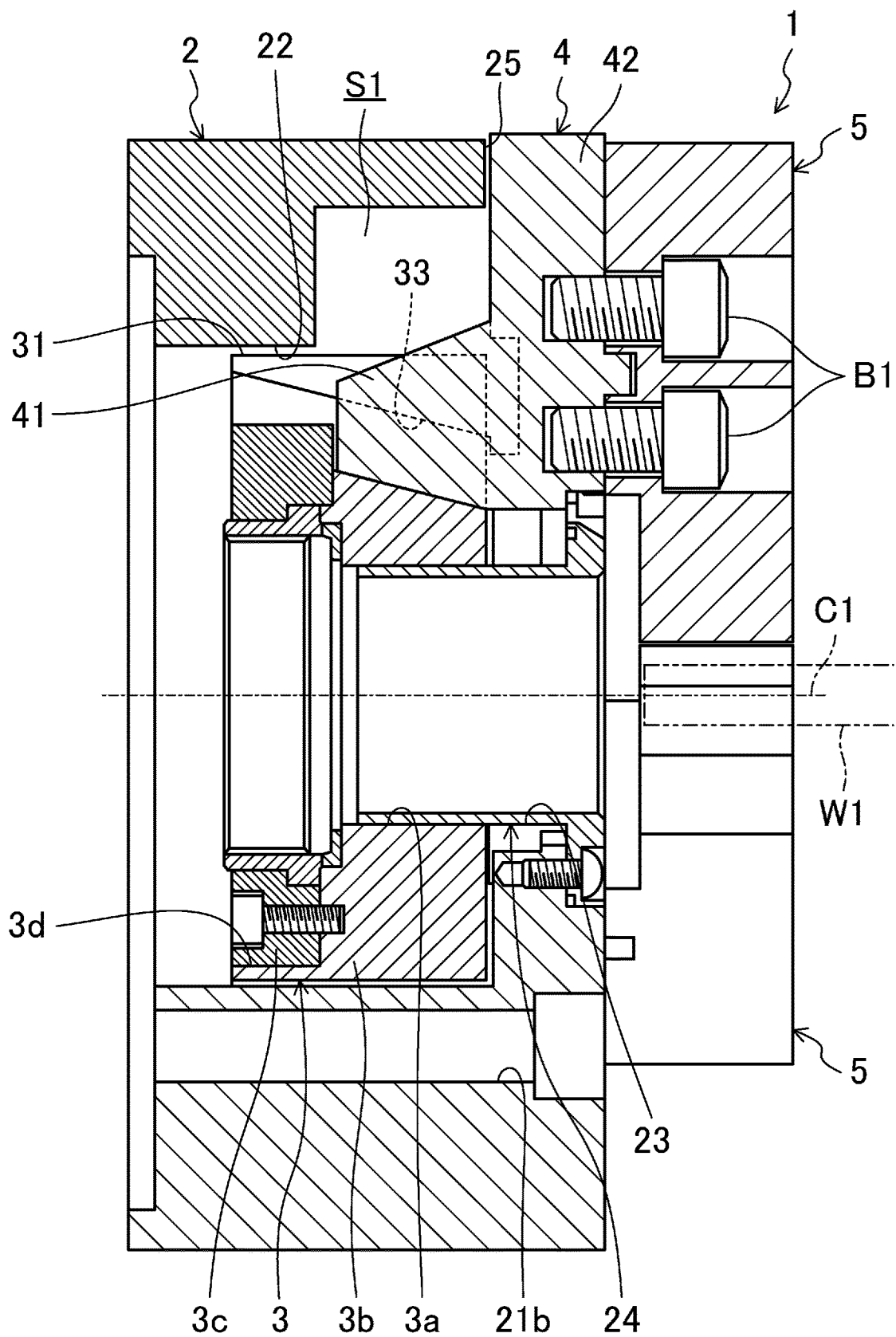
FIG. 8 is a view according to the second embodiment of the present invention and corresponds to FIG. 3.

FIGS. 7 and 8 illustrate a chuck device 1 according to a second embodiment of the present invention. The shape of the accommodation space S1 of the chuck body 2, a partial structure of the plunger 3, and the structure of the first slide portion 41 of the master jaw 4 are the only differences between the first and second embodiments. Only the differences will be described in detail below.

The accommodation space S1 of the second embodiment has approximately a triangular shape as viewed along the extension direction of the rotational axis C1. Such a bulging portion 21 as described in the first embodiment is not formed on the inner circumferential surface of the chuck body 2.

The plunger 3 of the second embodiment includes a plunger body 3b having approximately a triangular shape corresponding to the shape of the accommodation space S1. The plunger body 3b has an attachment recess 3d having a circular cross section and open to one end in the extension direction of the rotational axis C1.

The plunger body 3b includes protruding portions 31 of the second embodiment. A cutout groove 33 (an engaging means) having approximately a T-shaped cross section in a direction orthogonal to the rotational axis C1 is formed in an associated one of the protruding portions 31.

The cutout groove 33 is inclined so as to be gradually away from the rotational axis C1 as the cutout groove 33 gets closer to the one end in the extension direction of the rotational axis C1. The cutout groove 33 is open at both ends in the extension direction.

A ring-shaped attachment member 3c is attached to the attachment recess 3d. The attachment member 3c closes part of one end of each cutout groove 33.

The first slide portion 41 of the second embodiment has approximately a T-shaped cross section corresponding to the cutout groove 33, and is slidably fitted in the cutout groove 33.

Figure 9:
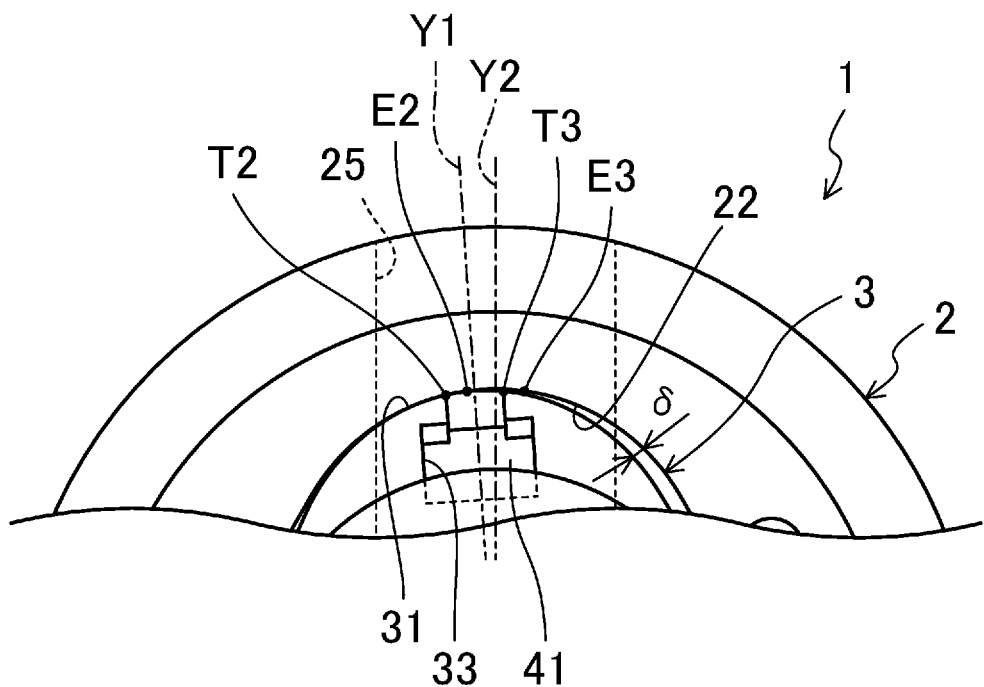
FIG. 9 is an enlarged view of the portion IX of FIG. 7.
Figure 10:
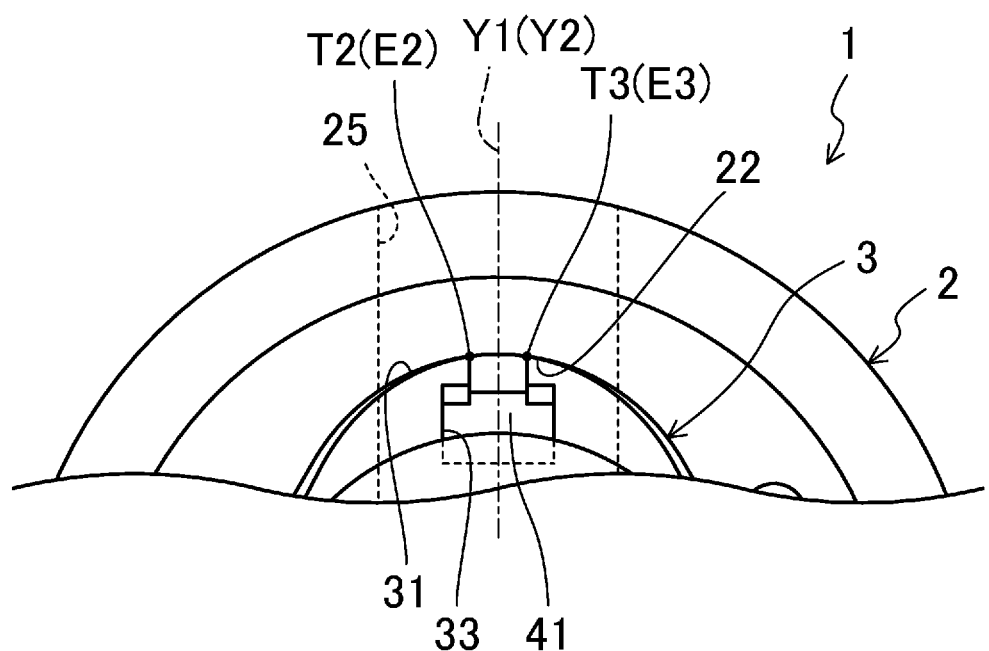
FIG. 10 is a view showing a state of gripping a work after the state shown in FIG. 9.

Note that when the work W1 is gripped by the chuck device 1 of the second embodiment, a reaction force of the gripping force generated by the gripping of the work W1 by the top jaws 5 is applied outward (in the Z1 direction) to a portion of the plunger 3 corresponding to the cutout groove 33 as illustrated in FIG. 7. The reaction force causes an outward elastic deformation of the portion of the plunger 3 corresponding to the cutout groove 33. As illustrated in FIGS. 9 and 10, the fitting recess 22 causes the plunger 3 to move in the F1 direction so that the portion deformed by the elastic deformation is slid on the inner circumferential surface of the fitting recess 22, and that opening peripheries T2, T3 of the cutout groove 33 of each protruding portion 31 reach predetermined deep end portions E2, E3 of the associated one of the fitting recesses 22, thereby causing a symmetry axis Y1, of each cutout groove 33, which passes through the central axis of the plunger 3, to coincide with a symmetry axis Y2, of each guide groove 25 of the chuck body 2, which passes through the rotational axis C1. Similarly to the first embodiment, in the second embodiment, too, the above configuration contributes to reducing or preventing variations in the position of the plunger 3 with respect to the chuck body 2 at the time of completion of the gripping of the work W1 by the top jaws 5, which means that the grip position of the work W1 does not misalign from a reference position. It is therefore possible to grip the work W1 precisely.

In FIGS. 9 and 10, the gap δ is exaggerated for purposes of convenience.

Third Embodiment of the Invention

Figure 11:
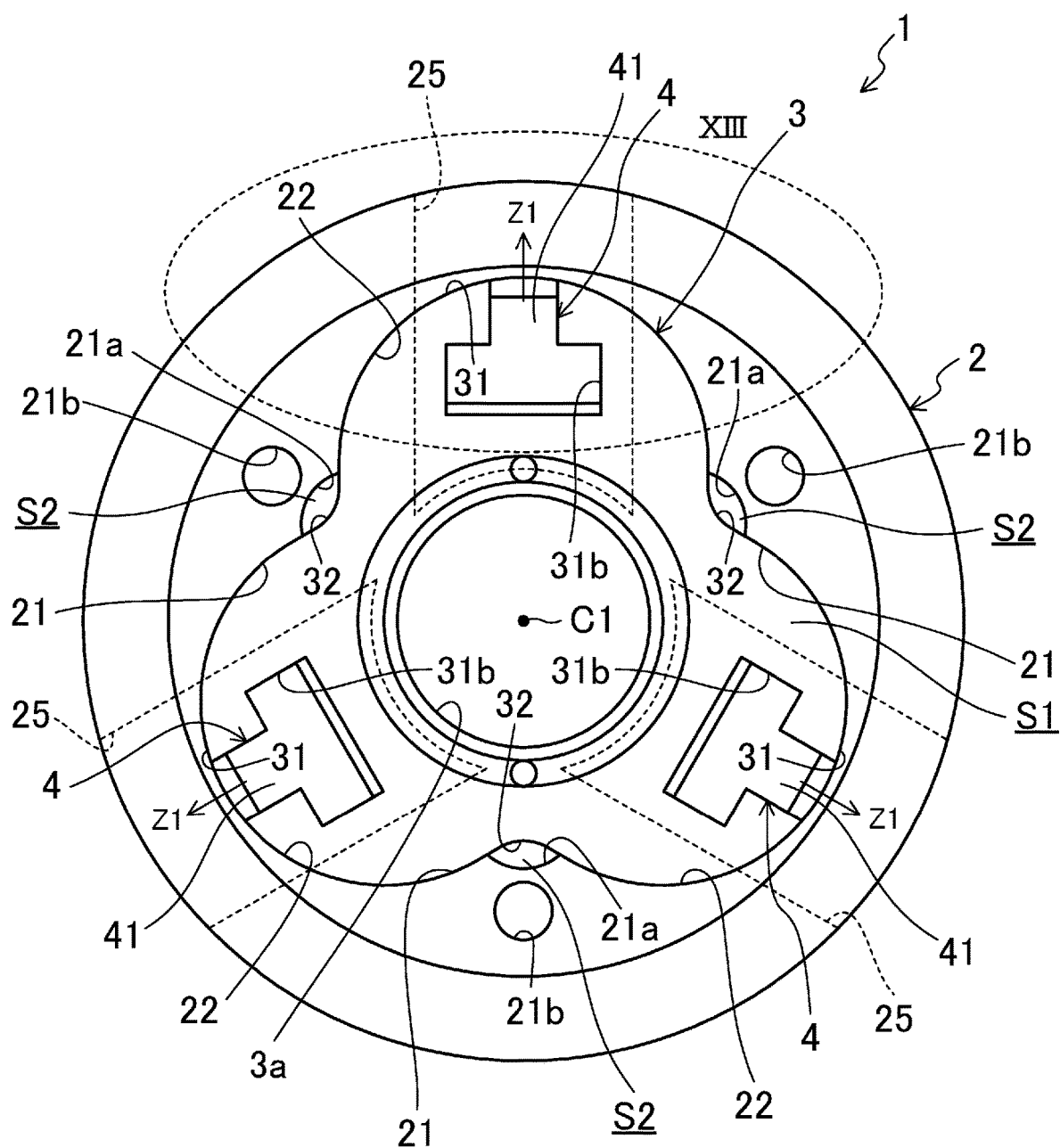
FIG. 11 is a rear view of a chuck device according to a third embodiment of the present invention.
Figure 12:
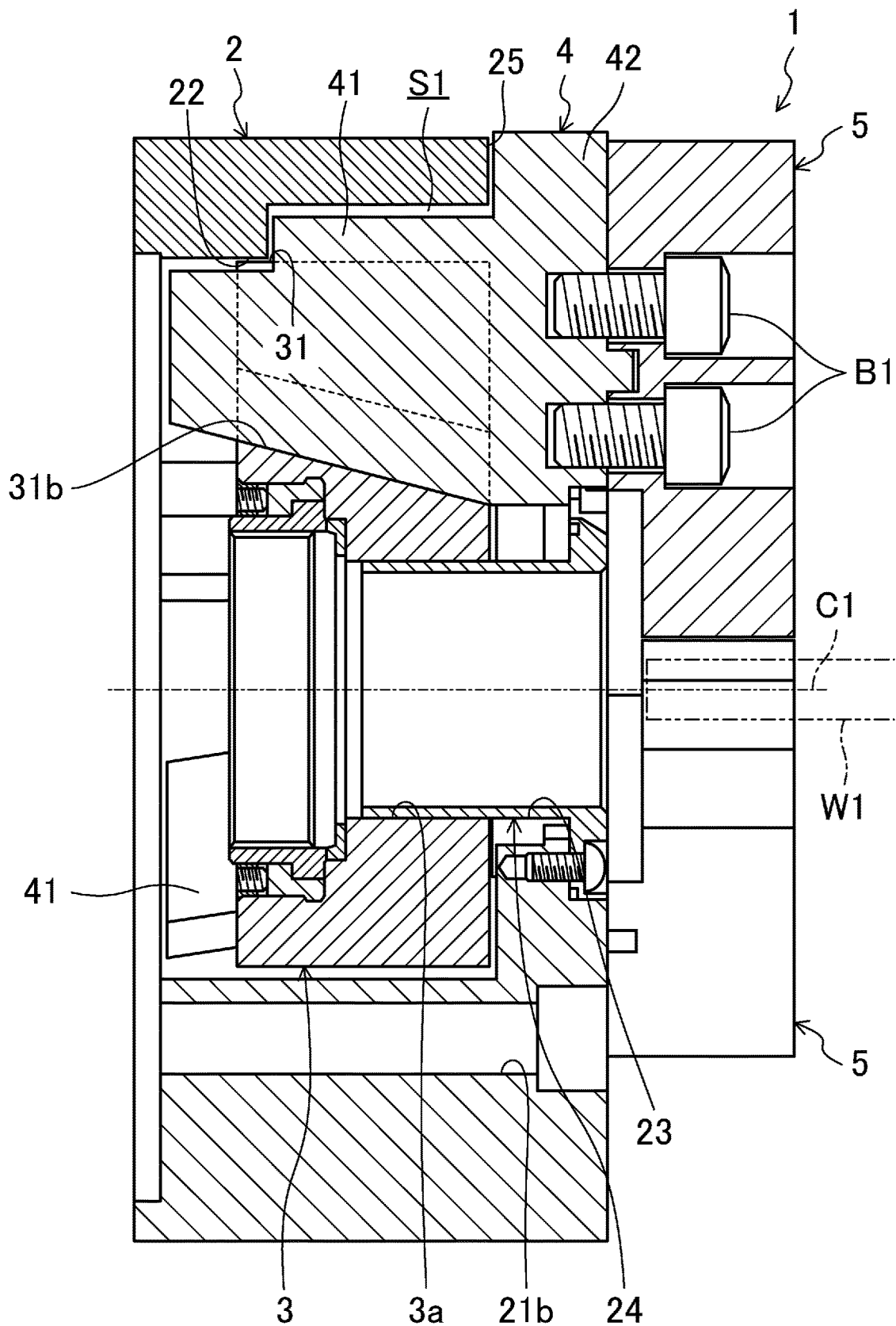
FIG. 12 is a view according to the third embodiment of the present invention and corresponds to FIG. 3.

FIGS. 11 and 12 illustrate a chuck device 1 according to a third embodiment of the present invention. The structure of the protruding portion 31 of the plunger 3 and the structure of the first slide portion 41 of the master jaw 4 are the only differences between the first and third embodiments. Only the differences will be described in detail below.

The protruding portion 31 of the third embodiment is provided with a slide groove 31b (an engaging means) having approximately a T-shaped cross section and inclined so as to be gradually away from the rotational axis C1 as the slide groove 31b gets closer to the one end in the extension direction of the rotational axis C1. Both ends of the slide groove 31b in the extending direction are open.

The first slide portion 41 of the third embodiment has approximately a T-shaped cross section corresponding to the slide groove 31b, and is slidably fitted in the slide groove 31b.

Figure 13:
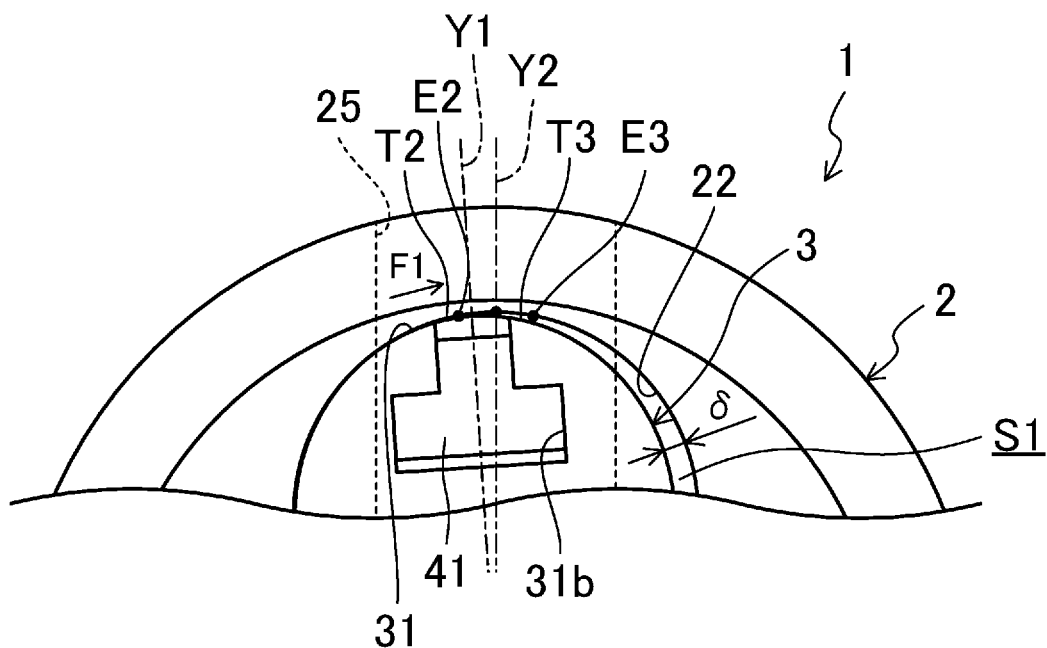
FIG. 13 is an enlarged view of the portion XIII of FIG. 11.
Figure 14:
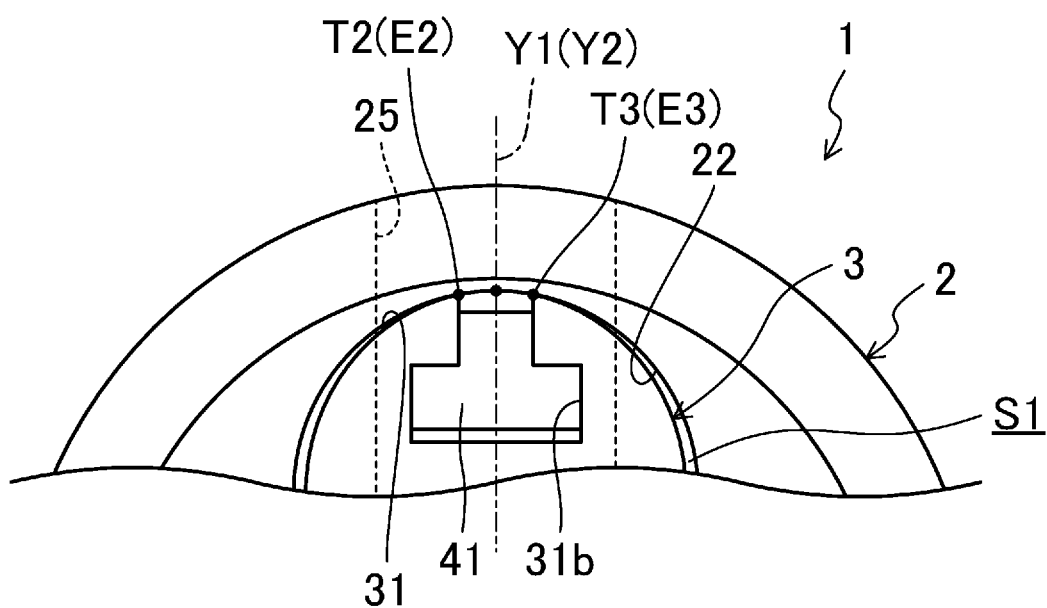
FIG. 14 is a view showing a state of gripping a work after the state shown in FIG. 14.

Note that when the work W1 is gripped by the chuck device 1 of the third embodiment, a reaction force of the gripping force generated by the gripping of the work W1 by the top jaws 5 is applied outward (in the Z1 direction) to a portion of the plunger 3 corresponding to the slide groove 31b as illustrated in FIG. 11. The reaction force causes an outward elastic deformation of the portion of the plunger 3 corresponding to the slide groove 31b. As illustrated in FIGS. 13 and 14, the fitting recess 22 causes the plunger 3 to move in the F1 direction so that the portion deformed by the elastic deformation is slid on the inner circumferential surface of the fitting recess 22, and that opening peripheries T2, T3 of the slide groove 31b of each protruding portion 31 reach predetermined deep end portions E2, E3 of the associated one of the fitting recesses 22, thereby causing a symmetry axis Y1, of each slide groove 31b, which passes through the central axis of the plunger 3 to coincide with a symmetry axis Y2, of each guide groove 25 of the chuck body 2, which passes through the rotational axis C1. Similarly to the first and second embodiments, in the third embodiment, too, the above configuration contributes to reducing or preventing variations in the position of the plunger 3 with respect to the chuck body 2 at the time of completion of the gripping of the work W1 by the top jaws 5, which means that the grip position of the work W1 does not misalign with a reference position. It is therefore possible to grip the work W1 precisely.

In FIGS. 13 and 14, the gap δ is exaggerated for purposes of convenience.

Fourth Embodiment of the Invention

Figure 15:
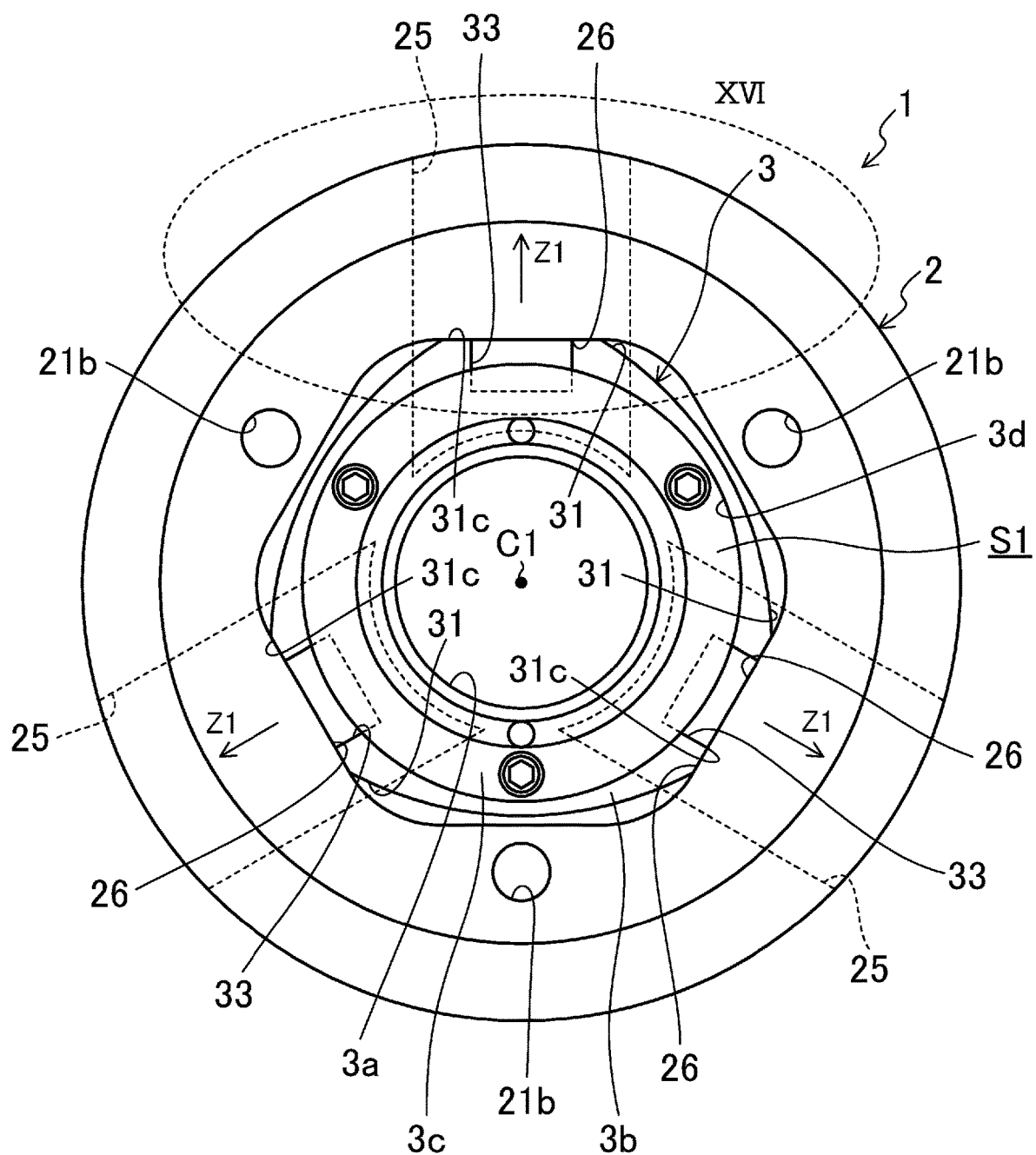
FIG. 15 is a rear view of a chuck device according to a fourth embodiment of the present invention.

FIG. 15 illustrates a chuck device 1 according to a fourth embodiment of the present invention. The shape of the accommodation space S1 of the chuck body 2 and the structure of the protruding portion 31 of the plunger 3 are the only differences between the second and fourth embodiments. Only the differences will be described in detail below.

One end, in the extension direction of the rotational axis C1, of each protruding portion 31 of the plunger 3 of the fourth embodiment has a flat surface 31c which is orthogonal to the rotational axis C1 and is also orthogonal to a straight line (the symmetry axis Y1 which passes through the rotational axis C1) which passes through the center of the cutout groove 33.

The accommodation space S1 of the fourth embodiment has approximately a regular hexagonal shape having gently curved corners as viewed along the extension direction of the rotational axis C1. That is, the inner circumferential surface of the chuck body 2 around the rotational axis C1 has six flat surfaces, three of which are orthogonal to the respective guide grooves 25 and serve as sliding surfaces 26 (positioning portions) toward which the respective flat surfaces 31c of the plunger 3 face with a slight gap δ interposed therebetween.

Figure 16:
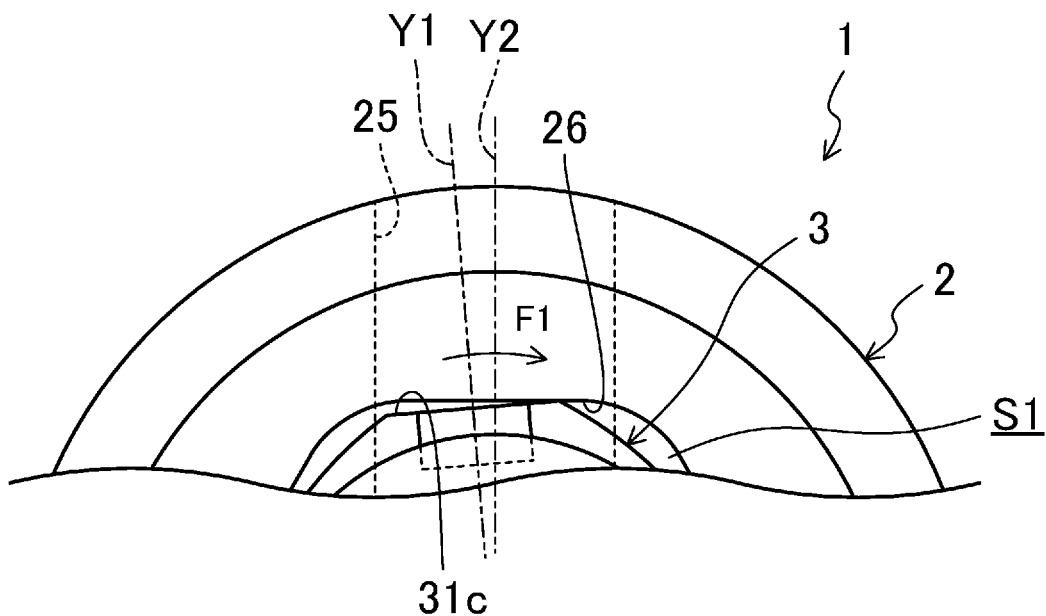
FIG. 16 is an enlarged view of the portion XVI of FIG. 15.
Figure 17:
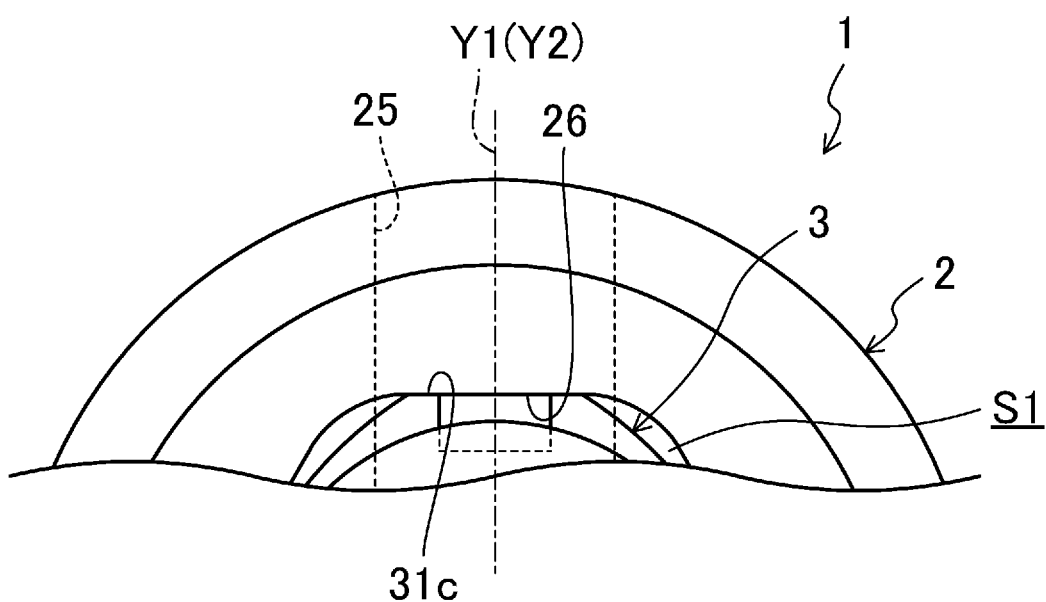
FIG. 17 is a view showing a state of gripping a work after the state shown in FIG. 16.

Note that when the work W1 is gripped by the chuck device 1 of the fourth embodiment, a reaction force of the gripping force generated by the gripping of the work W1 by the top jaws 5 is applied outward (in the Z1 direction) to a portion of the plunger 3 corresponding to the cutout groove 33 as illustrated in FIG. 15. The reaction force causes an outward elastic deformation of the portion of the plunger 3 corresponding to the cutout groove 33. As illustrated in FIGS. 16 and 17, the fitting recess 22 causes the plunger 3 to move in the F1 direction so that the portion (flat surface 31c) deformed by the elastic deformation is slid on the sliding surface 26, and therefore that the flat surface 31c is brought into tight contact with the sliding surface 26, thereby causing the symmetry axis Y1, of each cutout groove 33, which passes through the central axis of the plunger 3 to coincide with the symmetry axis Y2, of each guide groove 25 of the chuck body 2, which passes through the rotational axis C1. Similarly to the first to third embodiments, in the fourth embodiment, too, the above configuration contributes to reducing or preventing variations in the position of the plunger 3 with respect to the chuck body 2 at the time of completion of the gripping of the work W1 by the top jaws 5, which means that the grip position of the work W1 does not misalign with a reference position. It is therefore possible to grip the work W1 precisely.

Further, the chuck body 2 and the plunger 3 can be processed easier and more economically than in the second embodiment, because a portion where positioning of the plunger 3 with respect to the chuck body 2 is carried out is a flat surface.

In FIGS. 16 and 17, the gap δ is exaggerated for purposes of convenience.

In the fourth embodiment, three of the six surfaces of the chuck body 2 formed around the rotational axis C1, other than the sliding surfaces 26, are flat surfaces. However, the three surfaces may be curved surfaces that correspond to the outer circumferential surface of the plunger 3.

INDUSTRIAL APPLICABILITY

The present invention is suitable for a chuck device used by being attached to a machine tool such as a lathe.

DESCRIPTION OF REFERENCE CHARACTERS

1 Chuck Device
2 Chuck Body
3 Plunger
4 Master Jaw
5 Top Jaw
22 Fitting Recess (Positioning Portion)
25 Guide Groove (Guide Portion)
26 Sliding Surface (Positioning Portion)
31 Protruding Portion
31a Slide Hole (Engaging Means)
31b Slide Groove (Engaging Means)
31c Flat Surface
33 Cutout Groove (Engaging Means)
ρ1 First Curvature Radius
ρ2 Second Curvature Radius
C1 Rotational Axis
S1 Accommodation Space
W1 Work

The invention claimed is:

1. A chuck device comprising:
a chuck body rotatable about a rotational axis and having an accommodation space inside, the chuck body being provided with a plurality of guide portions around the rotational axis at equal intervals, the guide portions communicating with the accommodation space and extending in a direction orthogonal to the rotational axis;
a plurality of master jaws which are guided in the guide portions, one end portion of each of the plurality of master jaws being accommodated in the accommodation space, the master jaws having top jaws each attached to the other end portion of an associated one of the plurality of master jaws; and
a plunger accommodated in the accommodation space and arranged so as to be slidable along the rotational axis, the plunger being provided with a plurality of engaging means, each of which engages with the one end portion of the associated one of the master jaws, a sliding movement of the plunger in one direction causing the engaging means to move the master jaws along the guide portions toward a proximity of the rotational axis, thereby causing the top jaws to grip a work, and a sliding movement of the plunger in the other direction causing the engaging means to move the master jaws along the guide portions away from the rotational axis, thereby causing the top jaws to release the work,
wherein:
an inner circumferential surface of the chuck body around the rotational axis has a positioning portion, an outward elastic deformation that occurs, through gripping of the work with the top jaws, at portions of the plunger which correspond to the engaging means causes the portions deformed by the elastic deformation to slide on the positioning portion so that the plunger is moved to cause the engaging means to coincide with predetermined positions with respect to the guide portions, the plunger has protruding portions at positions corresponding to the engaging means, each of the protruding portions protruding so as to be away from the rotational axis and to have a curved cross section orthogonal to the rotational axis, and the positioning portion is composed of a plurality of fitting recesses each of which has a recess-shaped cross section orthogonal to the rotational axis, and in each of which an associated one of the protruding portions is fitted with a slight gap interposed therebetween.

2. The chuck device of claim 1, wherein:

an inner circumferential surface of each of the fitting recesses is curved to have a first curvature radius as viewed along an extension direction of the rotational axis, and an inner circumferential surface of each of the protruding portions is curved to have a second curvature radius as viewed along the extension direction of the rotational axis, and the first curvature radius, which is $\rho 1$, and the second curvature radius, which is $\rho 2$, are in a relationship of $\rho 1 \geq \rho 2$.

3. A chuck device, comprising:

a chuck body rotatable about a rotational axis and having an accommodation space inside, the chuck body being provided with a plurality of guide portions around the rotational axis at equal intervals, the guide portions communicating with the accommodation space and extending in a direction orthogonal to the rotational axis;

a plurality of master jaws which are guided in the guide portions, one end portion of each of the plurality of master jaws being accommodated in the accommodation space, the master jaws having top jaws each attached to the other end portion of an associated one of the plurality of master jaws; and a plunger accommodated in the accommodation space and arranged so as to be slidable along the rotational axis, the plunger being provided with a plurality of engaging means, each of which engages with the one end portion of the associated one of the master jaws, a sliding movement of the plunger in one direction causing the engaging means to move the master jaws along the guide portions toward a proximity of the rotational axis, thereby causing the top jaws to grip a work, and a sliding movement of the plunger in the other direction causing the engaging means to move the master jaws along the guide portions away from the rotational axis, thereby causing the top jaws to release the work, wherein:

an inner circumferential surface of the chuck body around the rotational axis has a positioning portion, an outward elastic deformation that occurs, through gripping of the work with the top jaws, at portions of the plunger which correspond to the engaging means causes the portions deformed by the elastic deformation to slide on the positioning portion so that the plunger is moved to cause the engaging means to coincide with predetermined positions with respect to the guide portions, the plunger has a plurality of flat surfaces at positions corresponding to the engaging means, each of the flat surfaces being orthogonal to the rotational axis and orthogonal to a straight line passing through a center of an associated one of the engaging means, and the positioning portion is composed of a plurality of sliding surfaces each of which is flat and orthogonal to an associated one of the guide portions, and toward which an associated one of the flat surfaces faces with a slight gap interposed therebetween.

* * * * *